(12) United States Patent
Lemercier

(10) Patent No.: US 12,171,246 B2
(45) Date of Patent: Dec. 24, 2024

(54) INTERCHANGEABLE PIPING MULTI-DECORATING TIP

(71) Applicant: Michel Lemercier, Merignac (FR)

(72) Inventor: Michel Lemercier, Merignac (FR)

(73) Assignee: Michel Lemerciea, Merignac (FR)

( * ) Notice: Subject to any disclaimer, the term of this patent is extended or adjusted under 35 U.S.C. 154(b) by 777 days.

(21) Appl. No.: 17/206,412

(22) PCT Filed: Sep. 26, 2019

(86) PCT No.: PCT/FR2019/000149
§ 371 (c)(1),
(2) Date: Jan. 3, 2022

(87) PCT Pub. No.: WO2020/070394
PCT Pub. Date: Apr. 9, 2020

(65) Prior Publication Data
US 2022/0240537 A1   Aug. 4, 2022

(30) Foreign Application Priority Data

Oct. 4, 2018 (FR) ........................................ 1801053

(51) Int. Cl.
*A23G 3/28* (2006.01)
*A21C 15/00* (2006.01)
*A23P 20/15* (2016.01)

(52) U.S. Cl.
CPC .............. *A23G 3/28* (2013.01); *A21C 15/005* (2013.01); *A23P 20/15* (2016.08)

(58) Field of Classification Search
CPC .......... A21C 15/005; A23P 20/15; A23G 3/28
See application file for complete search history.

(56) References Cited

U.S. PATENT DOCUMENTS

| | | | | |
|---|---|---|---|---|
| 1,657,299 | A * | 1/1928 | Dagley | A21C 11/16 |
| | | | | 425/191 |
| 2,782,735 | A * | 2/1957 | Anderson | B65B 39/00 |
| | | | | 425/464 |
| 2,928,533 | A * | 3/1960 | Loucony | A23G 3/28 |
| | | | | 401/176 |
| 3,664,794 | A * | 5/1972 | Wilton | A21C 15/005 |
| | | | | 425/192 R |
| 3,801,247 | A * | 4/1974 | Parrish | A23G 3/28 |
| | | | | 425/191 |

(Continued)

FOREIGN PATENT DOCUMENTS

WO    WO-2016079579 A1 *  5/2016  ........... A21C 15/005

*Primary Examiner* — Frederick C Nicolas

(57) ABSTRACT

The present invention relates to a multiple decorating tip intended for culinary preparations. More particularly, it is a modular device adaptable to a piping bag, a siphon, a pressure plunger or a pastry syringe allowing simultaneous, homogeneous, regular and rapid exit of a culinary preparation through different orifices including the shape can be chosen by the user. The device being made up of the association of at least three elements: a connection tip to the container; a reversible support with two parts, one lower and one upper, the latter attaching to the connection tip; a decorating tip plate with at least two decorating tip, the decorating tip plate being clamped between the upper part support and the lower part support.

4 Claims, 7 Drawing Sheets

(56) References Cited

U.S. PATENT DOCUMENTS

| | | | | |
|---|---|---|---|---|
| 3,878,992 | A | * | 4/1975 | MacManus ............... A23G 3/28 |
| | | | | 425/464 |
| 5,114,044 | A | * | 5/1992 | Spanek, Jr. ........... A21C 15/005 |
| | | | | 383/906 |
| 6,153,238 | A | * | 11/2000 | Shannon ................ A23G 3/203 |
| | | | | 426/115 |
| 2017/0203884 | A1 | * | 7/2017 | Sherman ................ B65D 35/38 |
| 2017/0325466 | A1 | * | 11/2017 | Folkmar ............... A21C 15/005 |

* cited by examiner

INTERCHANGEABLE PIPING MULTI-DECORATING TIP

FIELD OF THE INVENTION

The present invention relates to a decorating tip intended for culinary preparations. More particularly, it is a modular device adaptable to a piping bag, a siphon, a pressure plunger or a pastry syringe allowing a simultaneous, homogeneous, regular and rapid exit of a culinary preparation through various orifices including the shape can be chosen by the user.

BACKGROUND OF THE INVENTION

In the kitchen, a decorating tip is a conical-shaped cooking tool, most often adapted to a strong canvas piping bag, which is used to form a ribbon of cream with which culinary compositions are decorated. The tips have different patterns or different sizes to allow greater variety in the decoration of culinary compositions.

Traditionally, the piping bag is extended with a single piping tip which only allows one decorative element at a time and makes the decoration work long and time-consuming. In addition, it is difficult to change the pattern of the decorating tip until the bag is emptied. And the result obtained is often irregular.

Multiple decorating tip devices have been proposed in the prior art in an attempt to facilitate the work of professional and amateur cooks.

U.S. Pat. No. 1,657,299 thus describes a device consisting of a container for pasta whose lower part is annular and on which is held a second detachable annular element, comprising tabs extending downward, associated with a disc comprising a plurality of openings for the passage of the food dough, the disc fixing on the legs of the annular element. The drawback of this device is, on the one hand, that it does not adapt to all piping bags and, on the other hand, that it does not allow the disc with the dough outlet orifices to be easily changed as long as it is that the container of said paste is not empty.

The U.S. Pat. No. 3,664,794 is a decoration device allowing the production of a plurality of ribbons of cream in a single pressure, characterized in that it comprises an element comprising a plurality of circular openings in which decorating tip of the desired shape are positioned, the casing receiving element then locking on a fixing means which is positioned on a piping bag. But this device, which requires the installation of mono-TIP in a reception element, lacks practicality both in its use and in its maintenance.

In general, the existing devices have the drawback of not offering a practical and easily modular implementation of a multi-decorating tip device allowing work that is as fast and precise as it is creative.

SUMMARY OF THE INVENTION

The object of the present invention is to overcome all the drawbacks of the prior art by providing an interchangeable multi-decorating tip device.

This is a device for dispensing food decoration from a container of a food preparation, the device consisting of the reversible association of at least three elements:
- a connection end to the container;
- a support consisting of the reversible association of at least one top part and at least one bottom part, the top part being fixed to the connection end piece;
- a decorating tip plate comprising at least two decorating tip, said decorating tip plate being clamped between the upper part support and the lower part support.

According to a preferred embodiment, the decorating tip plate consists of a plate comprising at least two orifices, a decorating tip being fixed to each of said orifices, said decorating tip comprising a wall delimited by an inlet opening corresponding to the orifice and an outlet opening for the food preparation.

Preferably, at least one tip comprises a means of narrowing its inlet opening.

According to a variant, the decorating tip of the decorating tip plate have different dimensions.

According to another variant, the orifices of the decorating tip plate have different dimensions.

Advantageously, the lower part of the support comprises an opening comprising a shoulder constituting a means for maintaining the decorating tip plate.

According to another embodiment, the lower part of the support comprises at least one means for immobilizing the decorating tip plate.

Advantageously, the immobilization means is a lug.

Preferably, the decorating tip plate comprises at least one additional immobilization means.

According to another variant, the additional immobilization means is a notch positioned around the lug of the lower part of the support.

According to an advantageous embodiment, the upper part of the support comprises a means of reversible association with the lower part of the support and the lower part of the support comprises a complementary means of reversible association with the upper part of the support.

Preferably, the connection end piece comprises a means of reversible association with the upper part of the support and the upper part of the support comprises a complementary means of association with the connection end piece.

According to an alternative embodiment, the connection end piece comprises a means of association with the container of the food preparation.

DETAILED DESCRIPTION OF THE PREFERRED EMBODIMENTS

Figure 1:
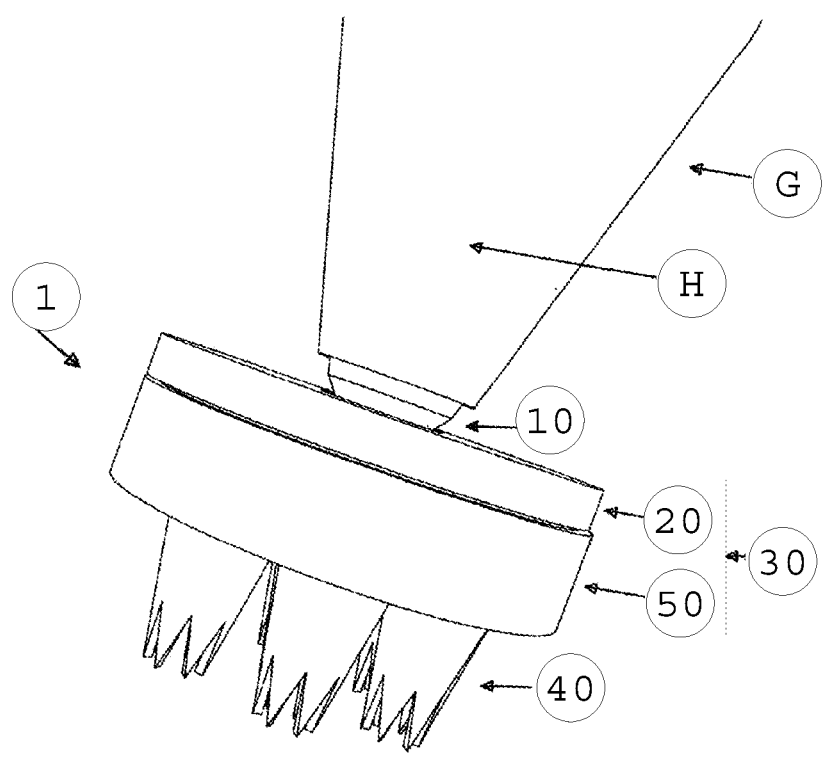
FIG. 1: perspective view of the device associated with a piping bag.
Figure 2:
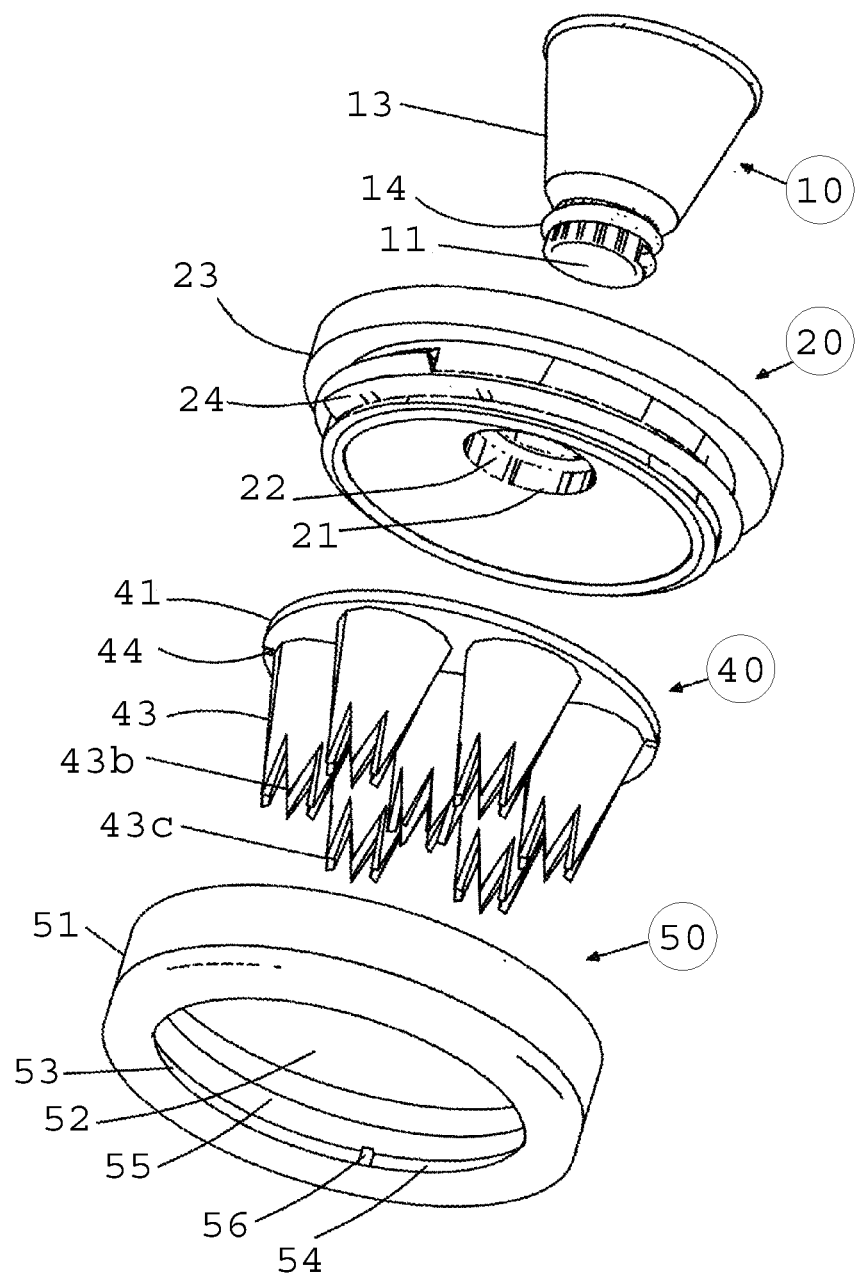
FIG. 2: perspective view of the exploded device.
Figure 3:
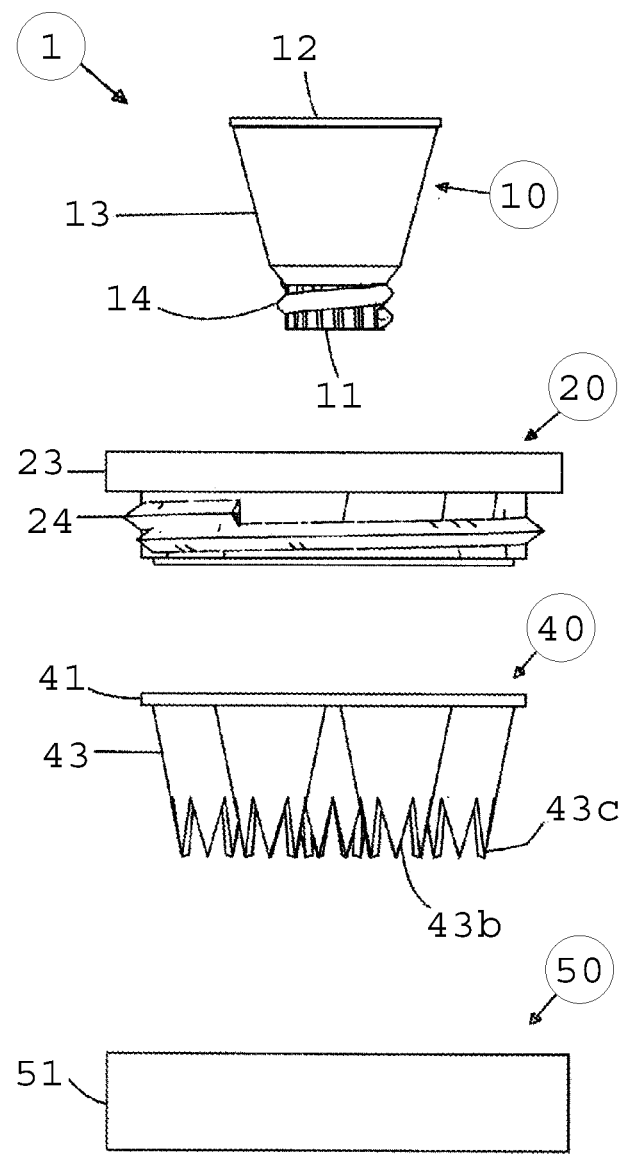
FIG. 3: side view of the exploded device.
Figure 4:
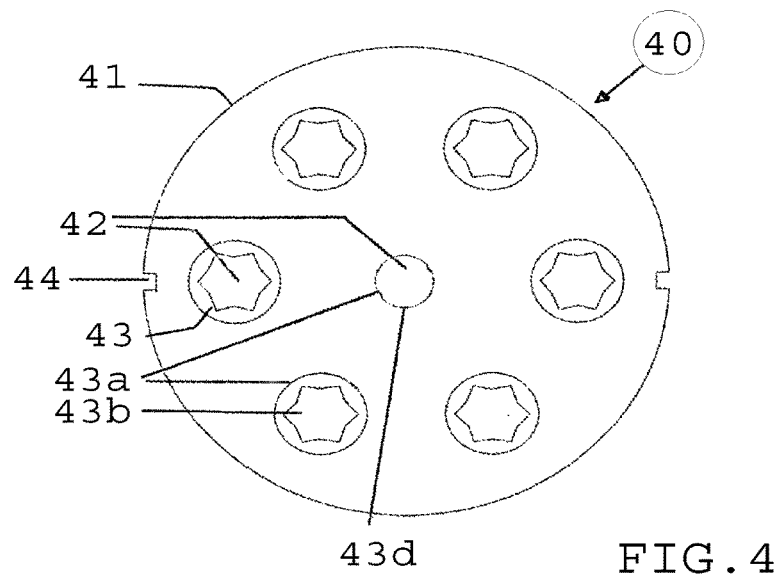
FIG. 4: top view of the multi decorating tip plate.
Figure 5:
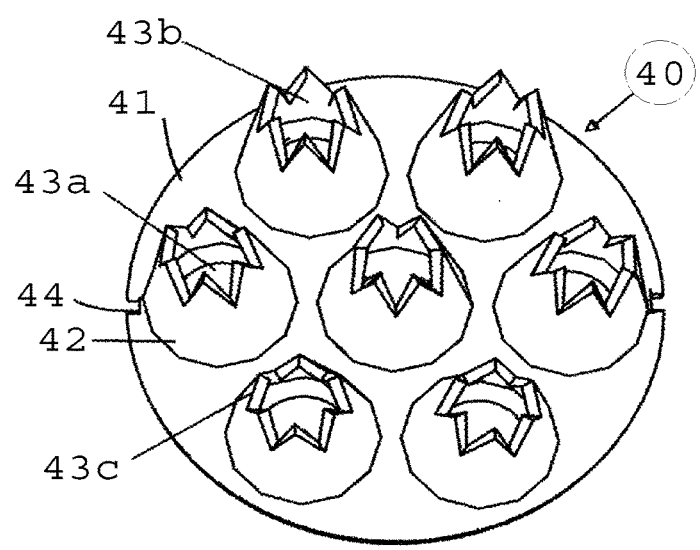
FIG. 5: bottom view of the multi decorating tip.

According to a preferred embodiment, the device (1) according to the invention consists of a connecting end piece (10) on which is fixed a support (30) consisting of an upper part. (20) and a lower part (50), these two parts enclosing a multi-decorating tip plate (40).

During its use, the device (1) according to the invention is associated with a container (G) of pasty, creamy, foamy food preparation (H), etc.

According to a preferred embodiment, the container (G) of food preparation (H) is a food piping bag conventionally used in cooking, open on one of its ends and having a narrow orifice on the other end in which it goes insert the device (1).

In order to simplify the understanding of the invention, the device (1) will be described in its position of use, as shown in FIG. 1. Compared to a work surface or to a dish containing food to be garnished or decorated, the device extends along a substantially vertical axis, the connection end piece (10) being located above the upper part support (20), itself being located above the lower part support (50). It is agreed, for the purposes of this description, that the upper part of the elements of the device (1) denotes the part oriented towards the connection end piece (10) and the lower part of the elements of the device (1) denotes the part oriented towards the lower part support (50).

The connection end piece (10) is conical in shape. Its wall (13) is delimited by an upper opening (12) and a lower opening (11), said openings being circular. The upper opening (12) has a larger diameter than the lower opening (11). On its lower opening (11), the connection end piece comprises an external thread (14). The connection end piece (10) allows the connection of the device (1) with the piping bag (G): the user slides the end piece (10) inside the piping bag (G), which has an orifice whose the diameter is substantially greater than that of the lower opening (11) of the connection end piece (10). The tip (10) will thus get stuck in the orifice of the piping bag (G), the width of the upper part of the tip (10) blocking it inside the piping bag (G). The upper part support (20) has the shape of a circular disc. It has a central orifice (21), the interior walls of which are threaded. This internal thread (22) is complementary to the thread (14) present on the lower end of the connection end piece (10) and enables the upper part support (20) to be fixed to the connection end piece (10) by screwing. On its upper part, the side wall of said support is smooth (23). On its lower part, said side wall comprises a means of association (24) with the lower part support (50).

According to a preferred embodiment, the association means is a thread (24). The lower part support (50) is a ring with a diameter identical to the diameter of the upper part support (20) and of a thickness substantially greater than the depth of the threaded part (24) of the upper part support (20). The side wall (51) of the lower part support is delimited by an upper opening (52) and a lower opening (53). The lower opening has a shoulder (54) extending inwardly of said support, said shoulder (54) being intended to serve as a retaining means for the multi-decorating tip plate (40). The diameter of the lower opening (53) of the lower part support (50) is therefore less than the diameter of the upper opening (52). Inside the lower part support (50), at the intersection between its side wall (51) and the shoulder (54) are positioned two lugs (56) intended to hold the multi-decorating tip plate (40) and constituting a means of immobilization of the latter.

According to a preferred embodiment, the lugs are diametrically opposed. On its inner wall, the lower part support (50) comprises a complementary association means (55) with the association means (24) of the upper part support (20).

According to a preferred embodiment, this complementary association means (55) is an internal thread. This tapping (52) by associating with the thread (24) present on the lower end of the upper part support makes it possible to fix the upper part support (20) to the lower part support (50) by screwing. Once associated, the upper side wall (23) of the upper part support (20) and the side wall (51) of the lower part support are in the same alignment.

According to an alternative embodiment, the support (30) comprises a hooking means (30) facilitating its opening and its closing.

The multi-decorating tip plate (40), or decorating tip plate, consists of a circular plate (41) comprising a plurality of circular orifices (42), a tip (43) extending each of said orifices. The circular plate (41) is thin and its diameter corresponds to the internal diameter of the lower part support (50). Said plate (41) comprises on its circumference two notches (44) constituting additional immobilization means.

In a preferred embodiment, the notches (44) are diametrically opposed. When the multi-decorating tip plate (40) is inserted into the lower part support (50), the circumference of the circular plate (41) rests on the shoulder (54) of the lower part support (50), the latter blocking the multi-decorating tip support (40) inside the lower part support (50). And the notches (44) are fitted around the lugs (56) of the lower part support (50), thus ensuring the immobilization of the multi-decorating tip plate (40).

According to a variant, the immobilization means (56) of the multi-decorating tip plate (40) present on the lower part support (50) can be notches and the additional immobilization means (44) present on the multi-decorating tip plate (40) can be to be dewclaws.

When the multi-decorating tip plate is positioned (40) in the lower part support (50), the tips (43) emerge through the lower opening (53) of the lower part support. Each of the tip (43) has a cone-shaped wall whose upper opening (43a), or inlet opening, is circular and is fixed to the circular plate (41) by molding, welding, additive printing or any other fixing means. The inlet opening (43a) is identical in shape and size to the port (42) extended by the tips (43).

The lower opening (43b), or outlet opening, of the tip (43b) is narrower than the upper opening (43a) and constitutes the outlet for the food preparation (H). The shape and size of the outlet end (43c) delimiting the lower opening (43b) allows the shape and size of the food preparation cord (H) emerging from it to be shaped.

According to a preferred embodiment, the lower opening (43b) of the tips of the device (1) is circular and crenellated.

According to other variant embodiments, it can have any other shape that adapts to the needs of the user.

According to a preferred embodiment as shown in FIGS. 1 to 5, the multi-decorating tip plate (40) comprises seven TIPS (43), a central TIPS and six TIPS positioned circularly around the central TIPS. In order to homogenize and regulate the flow of the food preparation (H) through the bushings (43) and to prevent the flow from concentrating towards the central bush, the orifice corresponding to said central bush is reduced by a shoulder (43d) constituting a means of narrowing said orifice (42).

According to an alternative embodiment, the number of tips (43) of the multi-decorating tip plate (40), their shape and their positioning can vary according to the desired result. The shoulders (43d) are then adapted and positioned in order to allow a homogeneous flow of the food preparation (H) through the various tips (43). The TIPS (43) can also have different dimensions, as well as the orifices (42).

The operation of the device when it is used is as follows: the connecting piece (10) is inserted into the piping bag (G) and is pushed into the opening of said piping bag, in which it locks, the upper opening (12) of the connection end piece (10) being wider than the opening of the piping bag (G). The upper part support (20) is then screwed onto the connection end piece (10). The user then positions the multi-decorating tip plate (40) inside the lower part support (50) by resting the circumference of the circular plate (41) against the shoulder (54) of said support (50) and associating lugs (56) and notches (44), the tips (43) emerging through its lower opening (53). Once the multi-decorating tip plate (40) is thus positioned, the lower part support (50) is screwed onto the upper part support (20), the multi-decorating tip plate (40) then being clamped and immobilized between the two parts of the support (20, 50).

The user can then pour the food preparation (H) into the piping bag (G), block its main opening and gradually reduce its volume by pressing it. Under the pressure, the food preparation (H) will move towards the device (1) which it will pass through until it is distributed between the various tips (43) of the multi-decorating tip plate (40). A food preparation tape (H) will exit through the outlet end (43c) of each of the tips. The user thus obtains a plurality of tapes the output of which is homogeneous and the shape of which is conditioned by the shape chosen for the end (43c) of output of the tips (43).

Figure 6:
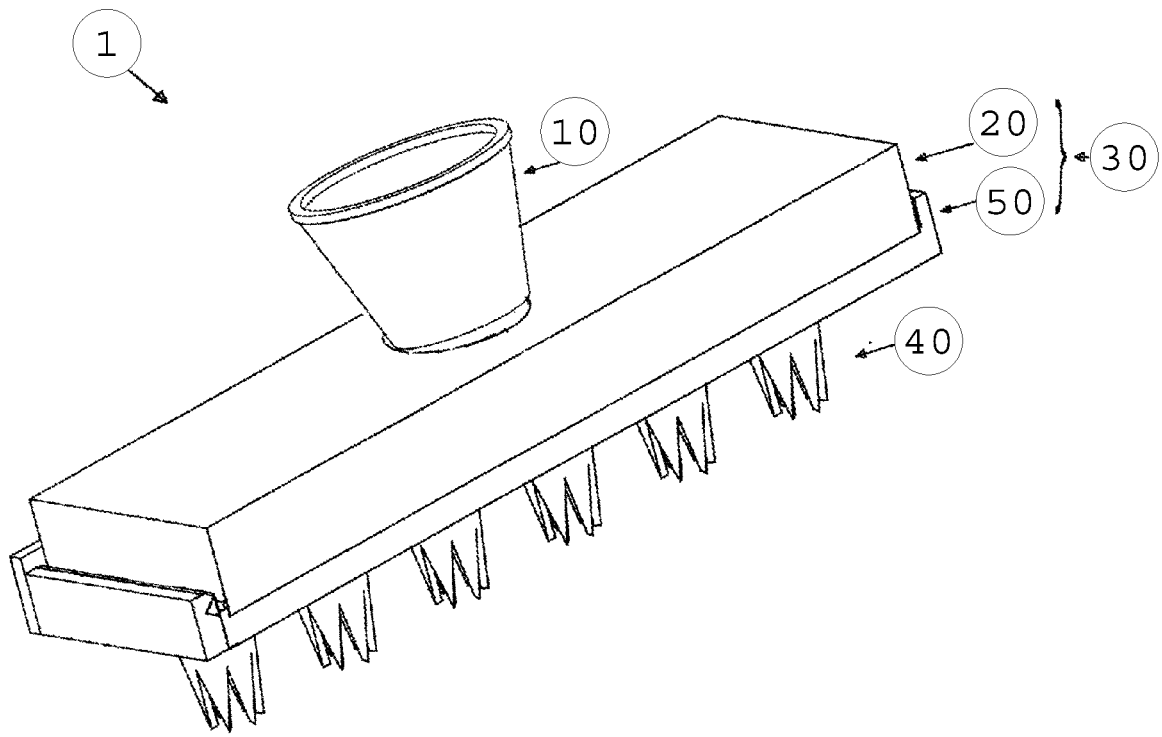
FIG. 6: perspective view of an alternative embodiment.
Figure 7:
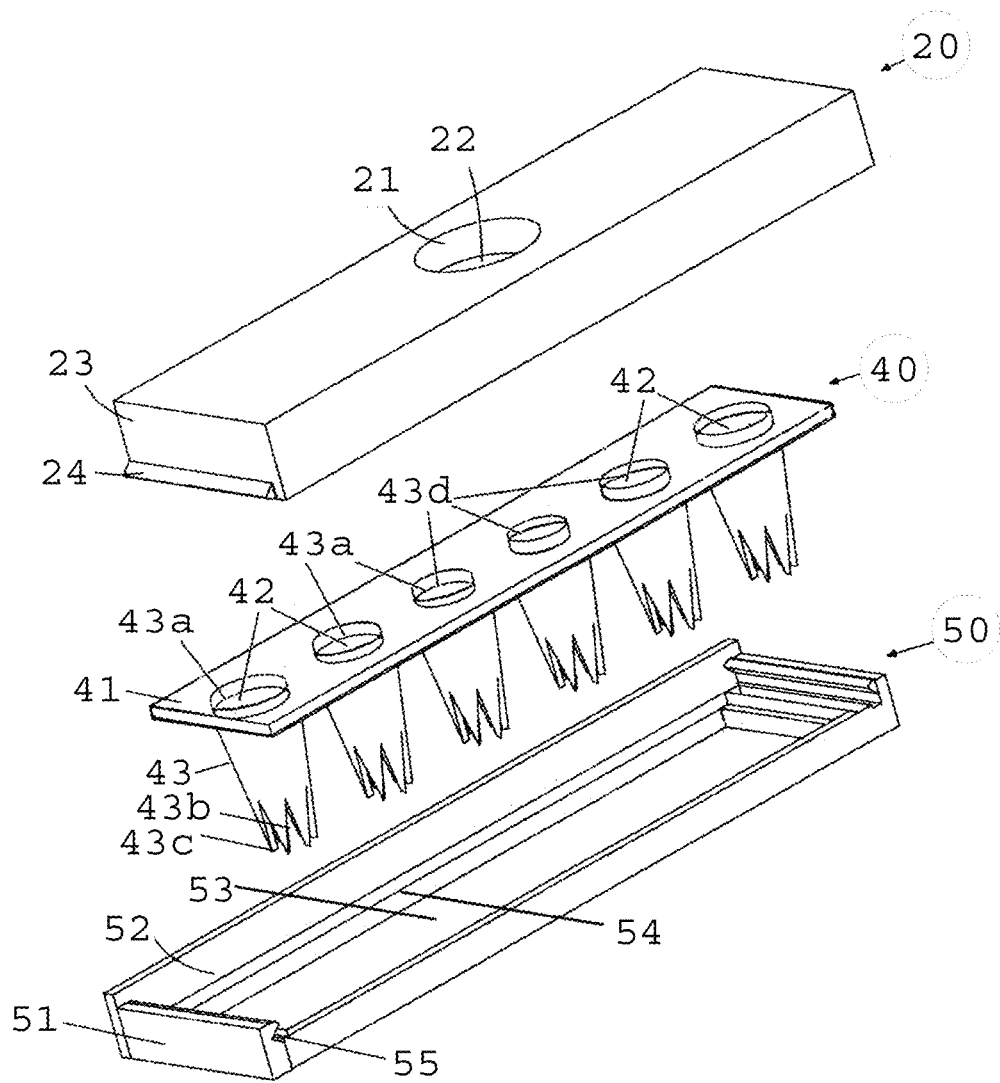
FIG. 7: exploded view of an alternative embodiment.
Figure 8:
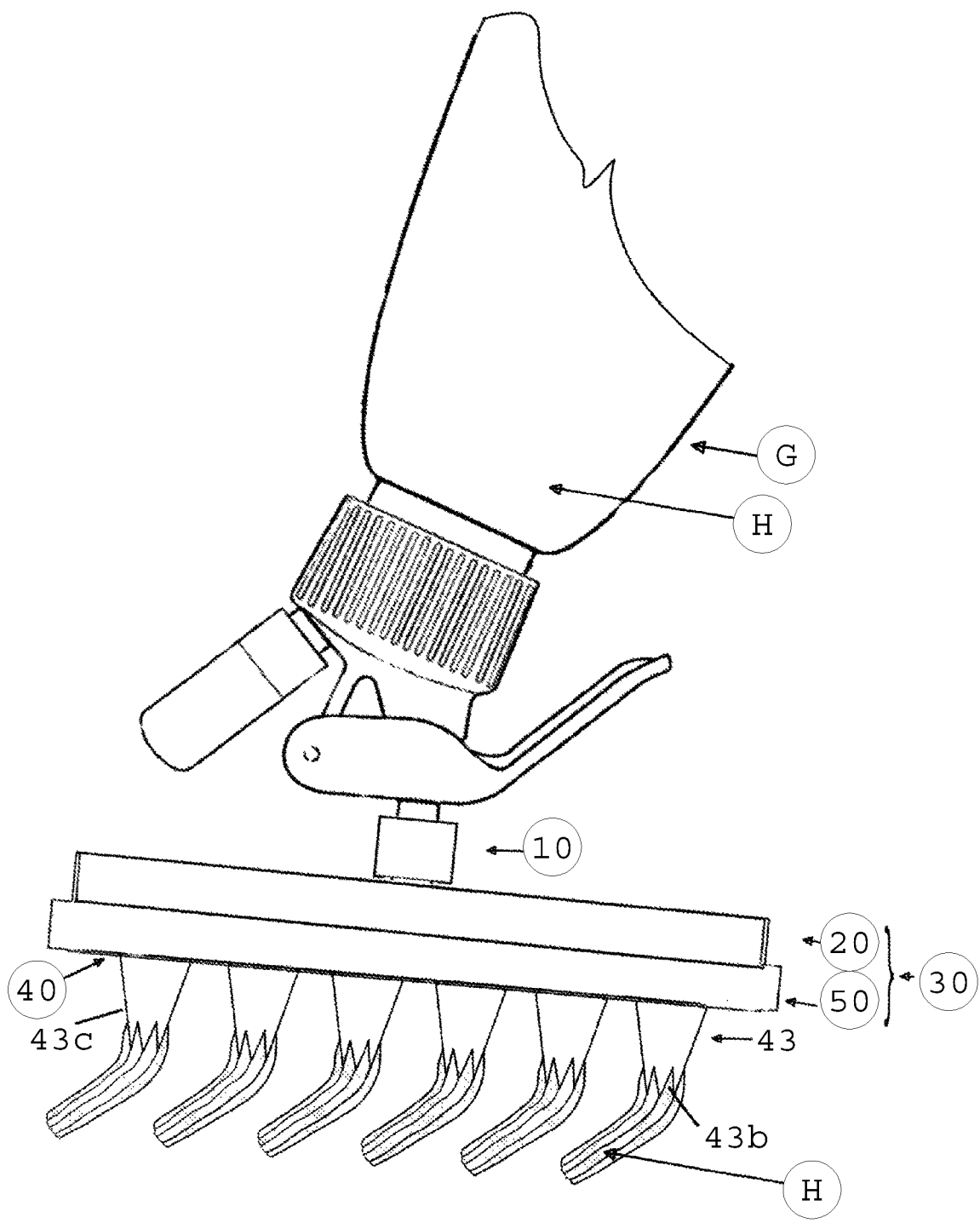
FIG. 8: view of an alternative embodiment associated with a siphon.

According to an alternative embodiment as shown in FIGS. 6 to 8, all the component parts of the device have the shape of a rectangular parallelepiped, with the exception of the connection end piece (10) which remains identical to that described above. The upper part support (20) is rectangular, with a threaded central hole (21). The means of association (24) with the lower part support (50) is a projection horizontally extending each of the widths of the upper part support (20). The lower part support (50) is also rectangular, its dimensions being substantially identical to those of the upper part support (20). It has an upper opening (52) and a lower opening (53), the latter comprising a shoulder (54). The complementary association means (55) to the upper part support (20) is a slide positioned on the inner wall of each of the widths of the lower part support (50): the projection (24) of each of the widths of the upper part support (20) slides inside the corresponding slide (55) present over the width of the lower part support (50). The plate (41) of the multi-decorating tip plate is also rectangular and is positioned on the shoulder (54) of the lower part support (50) before being covered by the upper part support (20).

In the rectangle parallelepiped embodiment, according to a variant, the slides (55) and projections (24) can be positioned on the lengths of the supports (50, 20).

In other embodiments, the upper part support, the multi-decorating tip plate and the lower part support can have any other shape: square, triangular, oval, polygon, etc.

The association means (24) and the complementary association means (55) allowing a reversible association of the upper part support (20) and lower part support (50) can have any other shape adapted to the general shape of device, such as bayonet fixing, casing, etc.

In the embodiments described above, the tips have a conical shape with a crenellated end.

According to other variant embodiments, they can have any other shape. The section, number and location of the decorating tip can vary indefinitely to suit the user's needs.

When the food preparation (H) is not fully used, the assembly consisting of the two parts of the support (20, 50) and the multi-decorating tip plate (40) can also be removed from the connection end piece (10) by unscrewing and a threaded plug whose diameter is adapted to the diameter of the lower opening of the connection end piece (10) can be screwed onto the latter.

According to an alternative embodiment, the connection end piece has an internal thread on the side of its upper opening (12). Said thread makes it possible to connect the device, by screwing, to other types of food containers (G) comprising a threaded end. This connection method is particularly suitable for siphons, pressure pistons, pastry syringes, etc.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. Device (1) for dispensing food decoration from a container (G) of a food preparation (H), said food preparation (H) being distributed by said device, characterized in that the device (1) is made up of at least three elements:
    at least one connection endpiece (10) to said container (G);
    at least one support (30) including at least one upper part (20) and at least one lower part (50), the at least one upper part (20) being fixed to the at least one connection endpiece (10);
    at least one multidecorating tip plate (40) comprising at least two decorating tips, the at least one multidecorating tip plate (40) consisting of a plate (41) comprising at least two orifices (42), the at least two decorating tips (43) being fixed to each of said at least two orifices (42), the at least two decorating tips (43) comprising a wall delimited by an opening (43a) corresponding to the at least two orifices (42) and an outlet opening (43b) of the food preparation (H), the at least one multidecorating tip plate (40) being clamped between the at least one upper part (20) and the at least one lower part (50) and at least one of the at least two paid orifices (42) of the at least one multidecorating tip plate (40) having different dimensions from at least one other of the at least two orifices (42).

2. Device (1) for dispensing food decoration according to claim 1 characterized in that at least one decorating tip of the at least two decorating tips (43) has a reduced diameter wall (43d) of the opening (43a).

3. Device (1) for dispensing food decoration according to claim 1 characterized in that at least one decorating tip (43) of the at least one multidecorating tip plate (40) has different dimensions from at least one other of the at least two decorating tips (43).

4. Device (1) for dispensing food decoration according to claim 1 characterized in that the at least one lower part (50) has an opening (53) comprising a shoulder (54) for supporting the at least one multidecorating tip plate (40).

* * * * *